(12) United States Patent
Gordon et al.

(10) Patent No.: US 10,876,084 B2
(45) Date of Patent: Dec. 29, 2020

(54) METHOD AND DEVICE FOR PRODUCING OF HIGH QUALITY ALCOHOLIC BEVERAGES

(71) Applicant: Cavitation Technologies, Inc., Chatsworth, CA (US)

(72) Inventors: Roman Gordon, Studio City, CA (US); Igor Gorodnitsky, Marina del Rey, CA (US); Maxim A. Promtov, Tambov (RU); Naum Voloshin, Los Angeles, CA (US)

(73) Assignee: Cavitation Technologies, Inc., Chatsworth, CA (US)

( * ) Notice: Subject to any disclaimer, the term of this patent is extended or adjusted under 35 U.S.C. 154(b) by 122 days.

(21) Appl. No.: 16/169,644

(22) Filed: Oct. 24, 2018

(65) Prior Publication Data

US 2019/0127671 A1  May 2, 2019

Related U.S. Application Data

(63) Continuation-in-part of application No. 15/796,570, filed on Oct. 27, 2017.

(51) Int. Cl.
*C12G 3/06* (2006.01)
*C12G 3/04* (2019.01)
(Continued)

(52) U.S. Cl.
CPC ............. *C12G 3/06* (2013.01); *B01J 19/008* (2013.01); *B01J 19/0066* (2013.01); *B01J 19/1806* (2013.01); *B01J 19/1825* (2013.01); *C12G 3/04* (2013.01); *C12G 3/08* (2013.01); *C12H 1/00* (2013.01); *C12H 1/12* (2013.01);
(Continued)

(58) Field of Classification Search
CPC ... C12G 3/06; C12G 3/04; C12G 3/08; C12G 2200/21; C12H 1/12; C12H 1/00; C12H 6/02; B01J 19/008; B01J 19/1806; B01J 19/1825; B01J 19/0066; A23V 2002/00
See application file for complete search history.

(56) References Cited

U.S. PATENT DOCUMENTS 4,127,332 A * 11/1978 Thiruvengadam .... B01F 5/0615
366/131
6,030,535 A * 2/2000 Hayashi ................. B01D 61/58
210/652

(Continued)

FOREIGN PATENT DOCUMENTS

WO    WO-2012003815 A2 * 1/2012 ............. C02F 1/34

*Primary Examiner* — Liam Royce
(74) *Attorney, Agent, or Firm* — Kelly & Kelley, LLP

(57) ABSTRACT

A method and device for producing high quality alcohol beverages, including liquor, cordial, tincture, whiskey, cognac, brandy, vodka, rum, gin, wine, cocktail, etc., is based on the action of hydrodynamic cavitation treatment of components of alcohol beverages. The fluid flow moves at a high rate through a multi-stage blending hydrodynamic device and multi-stage cavitation device to generate hydrodynamic cavitation features in the fluid flow. The cavitation features generate changes in the velocity, pressure, temperature, chemical composition and physical properties of the liquid. Hydrodynamic cavitation processing provides effective blending of components and homogenization of alcoholic beverage, improves its organoleptic qualities.

15 Claims, 7 Drawing Sheets

(51) Int. Cl.
   *C12G 3/08* (2006.01)
   *C12H 1/12* (2006.01)
   *C12H 1/00* (2006.01)
   *C12H 6/02* (2019.01)
   *B01J 19/18* (2006.01)
   *B01J 19/00* (2006.01)

(52) U.S. Cl.
   CPC ............ *C12H 6/02* (2019.02); *A23V 2002/00* (2013.01); *C12G 2200/21* (2013.01)

(56) References Cited

U.S. PATENT DOCUMENTS

2002/0096456 A1* 7/2002 Kim .................... B01F 5/0268
                                                       210/90
2016/0289619 A1* 10/2016 Mancosky .......... B01F 7/00816

\* cited by examiner

METHOD AND DEVICE FOR PRODUCING OF HIGH QUALITY ALCOHOLIC BEVERAGES

RELATED APPLICATION

This application is a continuation-in-part of U.S. application Ser. No. 15/796,570, filed Oct. 27, 2017.

BACKGROUND OF THE INVENTION

The invention relates to a method and device for producing high quality alcohol beverages—liquor, cordial, tincture, whiskey, cognac, brandy, vodka, rum, gin, wine, cocktail, etc.), and finds numerous applications in alcohol production and food industries. The method and device will improve the taste of alcoholic beverages and reduce the concentration of contaminants, including colloidal particles, microbiological and chemical impurities. The proposed method generates changes in the velocity, pressure, temperature, chemical composition and physical properties of a fluidic flow of the beverage in order to reduce the concentration of impurities and to improve the taste of alcoholic beverages.

In the production of alcoholic beverages one of the important stages of production is blending (assemblage or/and coupage) is a technique to produce wine or other alcoholic beverages. In order to change the physical or organoleptic properties of alcoholic beverages, blending of raw materials in certain proportions gives them new qualities. In the case of rose wine production, it is one of the techniques used, consisting in mixing white wine with some red wine. In the case of single-vintage, single-varietal wines, the grapes can be harvested from the same yield, but fermented from different batches.

Blending is used to modify coloring, bouquet, taste, typicality and condition of the main wine components. Blending of wine is also done when it is necessary to improve the taste of the fruits: to soften the sharpness, to reduce acidity, to remove the unpleasant aftertaste, and to add flavor. Quite often water and sugar are added to the juice to reduce the acidity.

Production of cognac after aging cognac alcohol involves blending, which consists in mixing of aged cognac spirits, alcoholized waters, fragrant waters, sugar syrup and color in certain proportions. To enhance the aroma and soften the taste of cognac, fragrant waters are introduced into the blend. Sugar syrup is used to soften the taste of cognacs. Sugar syrup is prepared by dissolving sugar in softened water, followed by adding aged cognac spirits to a volume fraction of alcohol 40% and citric acid. To make more intense coloring of cognacs, a dye is applied to the blend.

Blended whisky is a product obtained by mixing malt (produced from malt barley) and grain (made from corn or wheat) varieties of whiskey in different proportions. The composition of blended whiskey can include 15-50 malt varieties and 3-4 grain varieties with a shelf life of at least 3 years. First, malt varieties are mixed, and only then grain ones are mixed. The difference between the blended whiskey and single-malt whiskey is that single-malt drinks only include barley alcohols, while blended varieties contain other grain spirits of lower quality.

Even after purification in an industrial plant, ethanol and some alcohol beverages, made from ethanol, have low flavor qualities and a sharp odor. This is a consequence of the presence in ethanol of chemical impurities, which impair the organoleptic quality of alcohol beverages.

Alcohol beverages can contain such impurities as Acetaldehyde and/or Acetal, Benzene, Methanol, Fusel Oils (as Isobutyl, Isoamyl and active Amyl), Non Volatile Matter, Heavy Metals and others.

Physical-chemical characteristics of wines, liquors and other alcohol beverages are characterized by the content of ethanol, sugars, acids, polyphenols and other components. The number and combination of these substances depend on the organoleptic characteristics of alcohol beverages. This will be possible if consumers are able to purchase and use simple and reliable home devices for treatment of alcohol beverages to improve their organoleptic properties.

Methods of hydrodynamic treatment and cavitation treatment of liquids that change their physical-chemical properties are known. Cavitation can be of many origins, including acoustic, hydrodynamic, laser-induced or generated by injecting steam into a cool fluid. Acoustic cavitation requires a batch environment and cannot be used efficiently in continuous processing, because energy density and residence time would be insufficient for a high-throughput. In addition, the effect of acoustic cavitation diminishes with an increase in distance from the radiation source. Treatment efficacy also depends on a container size as alterations in the fluid occur at particular locations, depending on the acoustic frequency and interference patterns.

When a fluid is fed in a flow-through hydrodynamic cavitation device at a proper velocity, cavitation bubbles are formed as a result of the decrease in hydrostatic pressure inside the specially designed passages. When the cavitation bubbles transit into a slow-velocity, high-pressure zone, they implode. Such implosion is accompanied by a localized increase in both pressure and temperature, up to 1,000 atm and 5,000° C., and results in the generation of local jet streams, shock waves and shearing forces. The release of a significant amount of energy activates atoms, ions, molecules and radicals located in the bubbles and/or the adjacent fluid and drives chemical reactions and processes. The bubble implosion can be coincidental with the emission of light, which catalyzes photochemical reactions. (Suslick, 1989; Didenko et al., 1999; Suslick et al., 1999; Young, 1999; Gogate, 2008; Moholkar et al., 2008; Zhang et al., 2008.)

The main component of alcoholic beverages is water. Complex physical and chemical processes occur in the water subject to cavitation treatment. Its hardness decreases, i.e. water becomes softer. The electrical conductivity also decreases. The color value decreases by more than two times because of the collapse of humic acid molecules into free radicals, which precipitate. Because of intense cavitation microbiological impurities, such as bacteria, spores and viruses are almost completely neutralized in the water. Any water treatment process consists of conversion of substances dissolved in the water into insoluble substances or gases, and their subsequent removal (Kumar, J. K. Cavitation—a New Horizon in Water Disinfection. Water disinfection by ultrasonic and hydrodynamic cavitation. Verlag: VDM, 2010.).

Cavitation treatment of ethanol and alcohol beverages causes dissolution of impurities, decreases concentration of simple aldehydes and esters (acetaldehyde, methyl acetate, ethyl acetate, methanol, isopropanol, and other impurities) decreases, and precipitation by salts of heavy metals.

U.S. Patent Application No. 2013/0330454 to Mahamuni discloses a method and system for treatment of alcohol beverages. A process including ultrasonic processing by acoustic and hydrodynamic cavitation is applied to the beverage product in a controlled fashion so as to achieve a desired transformation thereon.

U.S. Patent Application No. 2016/0289619 to Mancosky disclosing the process of aging spirits to obtain aged liquors includes circulation of spirits through a cavitation zone. The method and apparatus obtain the same conversion of undesirable alcohols, flavor extraction and color as years of aging in an oak barrel.

Russian patent RU 2 359 024 (Ezhkov et al.) discloses a method for recirculation of alcohol-containing liquid in a device which consists of a container equipped with a recirculation circuit. During the recirculation, the liquid is warmed up, after that it is exposed to dispersion and homogenization in a steam-cavitation mode to improve the organoleptic characteristics of the alcohol-containing liquids.

In Russian patent RU2368657 (Denisov et al.) alcohol-containing liquid passes through the activator with turbulization part. After treatment of vodka in the activator, the content of Aldehydes, Fusel oils, Esters and Methyl Alcohols are decreased in it.

U.S. Pat. No. 9,474,301 to Gordon et al. discloses a method and device for manipulating alcoholic and non-alcoholic beverages to obtain desirable changes in the beverages, comprising subjecting said beverages to flow-through hydrodynamic cavitation process for a period of time sufficient to produce consumable product. In the case of wine, the method includes altering the composition and accelerating the conversion of ingredients to obtain wine with a superior homogeny, an extended shelf life and a mouth feel, flavor, bouquet, color and body resembling those of wine that was subjected to a traditional oak barrel maturation.

Accordingly, there is a need for a system and method that can more efficiently and effectively process alcoholic beverages to improve appearance, taste, aroma, bouquet, blending, shelf life, maturation, and other qualities. The present invention fulfills these needs and provides other related advantages.

SUMMARY OF THE INVENTION

The invention discloses the method and device for producing and improving alcoholic beverages—liquor, cordial, tincture, whiskey, cognac, brandy, wine, bear, cocktail, etc—in a number of qualities. The method and device is based on the action of hydrodynamic cavitation on components of alcoholic beverages. The fluid flow of an alcoholic beverage moves at a high rate in a flow path to generate hydrodynamic cavitation features in the fluid flow, generating changes in the fluidic flow's velocity, pressure, temperature, chemical composition and physical properties in order to reduce the concentration of impurities and alter other features.

The method involves blending of the components of alcoholic beverages and improving their flavor and aromatic characteristics through hydrodynamic cavitation treatment. Components of alcoholic beverages can be exposed to hydrodynamic cavitation treatment both separately before the blending process and during the blending process.

The multi-stage cavitation device in which the fluid flow is subjected to hydrodynamic cavitation comprises an inlet sleeve provided with channels having both constrictions and expansions. The channels are preferably shaped as Venturi tubes. Before the channels having contractions and expansions, the fluid can be exposed to elements to create vortex flow.

Accordingly, besides the objects and advantages of the high-speed fluid upgrading described herein, several objects and advantages of the present inventions are:

To provide a method that provides a high-throughput combined with a high efficiency of blending.
To provide a device that promptly generates changes in a fluid flow's velocity, pressure, temperature, chemical composition and properties.
To provide a compact apparatus, in which cavitation facilitates destruction of contaminants.
To provide a system that increases the efficiency of aging.
To provide a system that increases organoleptic indices of alcoholic beverages.

The present invention is directed to increasing of blending efficiency, reducing impurities affecting flavor, aroma and visual quality of alcohol beverages. The blending system includes dosing pumps, a main pump, a multi-stage blending hydrodynamic device and a multi-stage cavitation device. Dosing pumps are designed to accurately dispense components of alcoholic beverages. The main pump is used to provide a flow of blended alcoholic beverage for hydrodynamic cavitation treatment in a multi-stage cavitation device. The multi-stage cavitation device is fluidly connected to a fluid discharge from the pump.

The blending system may further include a receiving tank configured to receive and store fluid for treatment. The receiving tank is disposed upstream of the pump and fluidly connected to a fluid inlet on the pump.

The process of blending and improving the organoleptic properties of alcoholic beverages may consist of several stages of hydrodynamic cavitation treatment of components of alcoholic beverages. One or more components of alcoholic beverages can be exposed to a preliminary hydrodynamic cavitation treatment before blending. Blending of alcoholic beverages can be realized in one pass through a multi-stage blending hydrodynamic device or it can be realized by cyclic multiple treatment in a multi-stage cavitation device.

The process may also include the steps of storing a predetermined quantity of the untreated fluid in a receiving tank, and pumping the untreated fluid from the receiving tank to the multi-stage cavitation device.

The present invention is directed to a method for the treatment, blending and improvement of organoleptic indicators of alcoholic beverages. The method begins with pumping a treatment liquid under pressure into a multi-stage cavitation device. The treatment liquid is processed in the multi-stage cavitation device to form a processed liquid. The processing includes generating hydrodynamic cavitation in the treatment liquid.

The multi-stage cavitation device preferably has at least two cavitation stages, each cavitation stage comprising a part for liquid flow swirl and a cylinder body defining a central channel having a constriction and an expansion. The multi-stage cavitation device may include a plurality of multi-stage cavitation devices connected in series.

The processing of the treatment liquid includes generating hydrodynamic cavitation in the liquid by changing fluid velocity and fluid pressure within the multi-stage cavitation device. The hydrodynamic cavitation alters temperature, chemical composition and physical properties of the treatment liquid. The pumping, processing, and blending steps may be repeated on the blending liquids one or more times before performing the discharging step.

Components of the blended alcoholic beverage can be stored in tanks. The components of the alcoholic blended beverage can be fed into the mixing system from the tanks by dosing pumps. The components of the blended alcoholic beverage before blending can be subjected to hydrodynamic cavitation treatment. A blended alcoholic beverage after blending can be subjected to a single or multiple hydrodynamic cavitation treatment. After the hydrodynamic cavitation treatment, the blended alcoholic beverage can be filtered before discharging into the tank.

A single housing may be provided that contains in sequence the multi-stage cavitation device and the blending system. The single housing preferably includes at least one cavitation stage and one blending module. Each cavitation stage includes a part for liquid flow swirl and a cylinder body defining a central channel having a constriction and an expansion. The blending module includes a cylinder body defining a central channel having a constriction and an expansion and channel for injecting.

The present invention is directed to a system for production, purification and improvement of organoleptic indicators of alcoholic beverages. The alcoholic beverage may include liquor, cordial, tincture, whiskey, cognac, brandy, vodka, rum, gin, wine, cocktails, etc. The components of alcoholic beverages may be crude, filtrated, or purified. Components for the production of alcoholic beverages can be water, ethyl alcohol, ethyl alcohol solution, solutions of dyes, flavoring agents, sugars, acidity regulators and other components.

The system preferably includes storage tanks fluidly connected to dosing pumps, which in turn are fluidly connected to a blending module. The system may also include a multi-stage cavitation device, which is in turn fluidly connected to dosing pumps and a blending module. The system includes a blending module fluidly connected to the main high-pressure pump to supply treatment fluid to a multi-stage cavitation device. The multi-stage cavitation device may be fluidly connected to the storage tank to recycle the processed treatment fluid.

The multi-stage cavitation device preferably has an inlet fluidly connected to the dosing pump or main pump. The multi-stage cavitation device has at least one cavitation stage, but preferably multiple cavitation stages, each cavitation stage comprising a portion for liquid flow swirl and a cylinder body portion defining a central channel having a constriction and an expansion.

The present invention is directed to a system for producing an alcoholic beverage. The system includes a main fluid tank, a system pump fluidly connected to a processing outlet on the main fluid tank, a hydrodynamic cavitation device fluidly connected to an outlet on the system pump, and a return line fluidly connecting an outlet of the hydrodynamic cavitation device to the main fluid tank. The hydrodynamic cavitation device comprises a plurality of cavitation stages, where each of the plurality of cavitation stages comprises a swirling element forming a spiral flow path followed by a cavitation element forming a constricted-expanded flow path.

The swirling element of the cavitation stage is preferably a helical surface forming a twisted plate, an auger, or a screw. Such a swirling element preferably has a length that satisfies the relationship $0.5H<=L<=3H$, where H is a height of a step and L is the length of the swirling element. The swirling element also preferably has an angle of rotation of 180 degrees when $L=0.5H$ and 1080 degrees when $L=3H$, with proportional angles of rotation in between such lengths.

The system also includes a plurality of inlet fluid tanks fluidly connected to the main fluid tank, wherein each inlet fluid tank contains a fluid component of the alcoholic beverage. A hydrodynamic blending device is fluidly disposed between the plurality of inlet fluid tanks and the main fluid tank. Such hydrodynamic blending device comprises a plurality of mixing stages, the number of mixing stages corresponding to one less than the number of inlet fluid tanks. Each of the plurality of mixing stages comprises a swirling element forming a spiral flow path followed by a cylinder element forming a constricted-expanded flow path and having a side inlet channel in the cylinder element. The blending device preferably comprises a cavitation stage disposed after the plurality of mixing stages.

One of the plurality of inlet fluid tanks is fluidly connected to a main inlet on the blending device and the remaining plurality of inlet fluid tanks are each fluidly connected to one of the plurality of mixing stages through the corresponding side inlet channel. The side inlet channel is preferably oriented at an angle of intersection ($\alpha$) relative to the cylinder element according to the relationship $\beta/2<=\alpha<=90$ degrees, where $\beta$ is an angle of a conical surface in the cylinder element immediately before the constricted-expanded flow path.

The system further includes a dosing pump and an individual cavitation device serially and fluidly disposed between each of the plurality of inlet fluid tanks and the blending device. The individual cavitation device preferably has a plurality of cavitation stages, each stage having a swirling element forming a spiral flow path followed by a cavitation element forming a constricted-expanded flow path. The system may also include a bypass line selectively connecting the dosing pump directly to the blending device, bypassing the individual cavitation device.

A filter element may be fluidly disposed between the hydrodynamic cavitation device and the main fluid tank. Alternatively, the filter element may be fluidly connected to a final outlet on the main fluid tank. A safety valve may fluidly connecting the system pump directly to the main fluid tank so as to selectively bypass the cavitation device.

The present invention is also directed to a process for producing an alcoholic beverage. The process includes blending a plurality of alcoholic beverage components to form a blended fluid mixture. The blended fluid mixture is pumped into a hydrodynamic cavitation device. The hydrodynamic cavitation device swirls the blended fluid mixture in a spiral flow path and then cavitates the blended fluid mixture in a constricted-expanded flow path. In the context of this application the term "constricted-expanded flow path" means a fluid passage that contains a constricted element, such as a decreasing conical shape into a narrower passage, follows by an increasing conical shape into a wider passage. After the hydrodynamic cavitation device, the cavitated blended fluid mixture is sent to a main fluid tank.

The blending step may further include providing a separate inlet fluid tank for each of the plurality of alcoholic beverage components, and introducing each of the plurality of alcoholic beverage components from the corresponding separate inlet fluid tank to the main fluid tank. The main fluid tank may include agitating elements to mix the plurality of alcoholic beverage components. The pumping step may involve pumping the blended fluid mixture from the main fluid tank into the hydrodynamic cavitation device. The process may also include filtering the cavitated blended fluid mixture from an outlet on the main fluid tank.

The swirling step is preferably carried out across a swirling element comprising a twisted plate, an auger, or a screw, wherein the swirling element has a length that satisfies the relationship $0.5H<=L<=3H$, where H is a height of a step and L is the length of the swirling element. The swirling element may also have an angle of rotation of 180 degrees when $L=0.5H$ and 1080 degrees when $L=3H$, or proportional degrees of rotation in between such lengths.

The blending step preferably includes providing a separate inlet fluid tank for each of the plurality of alcoholic beverage components. In addition, a multi-stage blending device having a plurality of mixing stages may also be provided. Each of the plurality of mixing stages in the blending device preferably has a swirling element forming a spiral flow path followed by a cylinder element forming a constricted-expanded flow path. The blending device further has a main inlet fluidly connected to a first of the plurality of mixing stages and a plurality of side inlets each being fluidly connected to the cylinder element in one of the other plurality of mixing stages.

The blending step then includes dose pumping each of the plurality of alcoholic beverage components from the corresponding separate inlet fluid tank to the main inlet or one of the plurality of side inlets on the multi-stage blending device. The plurality of alcoholic beverage components are then blended in the blending device to form a blended fluid mixture.

The process further includes providing an individual cavitation device fluidly disposed between each of the plurality of alcoholic beverage components in the corresponding separate inlet fluid tank and the main inlet or one of the plurality of side inlets on the blending device. Each of the plurality of alcoholic beverage components is cavitated in the corresponding individual cavitation device.

The present invention is also directed to a method for producing alcohol beverages. The method includes processing one or more components of an alcohol beverage in a multi-stage cavitation device to form a processed liquid, wherein the processing comprises generating hydrodynamic cavitation in the one or more components of the alcoholic beverage. The one or more components of the alcohol beverage are also blended in a multi-stage blending device to form a blended alcohol beverage. The blended alcohol beverage is then processed in a primary multi-stage cavitation device to form a processed liquid, wherein the processing comprises generating hydrodynamic cavitation in the blended alcohol beverage. The processed liquid is then purified through a filter module to form a purified alcohol beverage, wherein the purifying comprises reducing a concentration of contaminants, solid particles, and colloidal particles in the processed liquid. The purified alcohol beverage is then discharged from the filter module.

The individual multi-stage cavitation devices and the primary cavitation device each comprises at least one cavitation stage, each cavitation stage comprising a swirling element and a cylinder body defining a central channel having a constriction and an expansion. The multi-stage blending device comprises at least one blending stage comprising a swirling element and a cylinder body defining a central channel having a constriction and an expansion, and a side channel in the cylinder body for injecting one of the components of the alcohol beverage into the central channel. The blending device is distinguished from the cavitation device primarily in the addition of the side channels, as well as, the inlet pump pressure, which is insufficient in the blending device to initiate cavitation.

The blending step of the one or more components of the alcohol beverage preferably occurs sequentially, along the multi-stage blending device. The number of blending stages of the multi-stage blending device preferably corresponds to one less than the number components of the alcohol beverage entering the multi-stage mixing device. The swirling element in the blending device is preferably formed as a twisted plate, and auger, or a screw into a single-thread or multiple-thread element. A length of the swirling element (L) preferably satisfies the relationship $0.5H<=L<=3H$, where H is a step height of a screw part. The side channel in each of the blending stages is preferably oriented at an angle of intersection ($\alpha$) relative to the cylinder element according to the relationship $\beta/2<=\alpha<=90$ degrees, where $\beta$ is an angle of a conical surface in the cylinder element immediately before the constriction in the central channel.

The processing steps preferably generate hydrodynamic cavitation in the blended alcohol beverage by changing fluid velocity and fluid pressure within the multi-stage cavitation device. The hydrodynamic cavitation generated in the processing step alters temperature, chemical composition and physical properties of the alcohol beverage. The method further includes repeating the pumping and processing steps on the alcohol beverage before performing the discharging step. The alcohol beverages are preferably selected from the group consisting of liquor, cordial, tincture, whiskey, cognac, brandy, vodka, rum, gin, wine, and cocktail. The components of the alcohol beverage are preferably selected from the group consisting of purified water, food ethyl alcohol, solutions of dyes, aromatic additives, acidity regulators, softening additives, and plant extracts.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
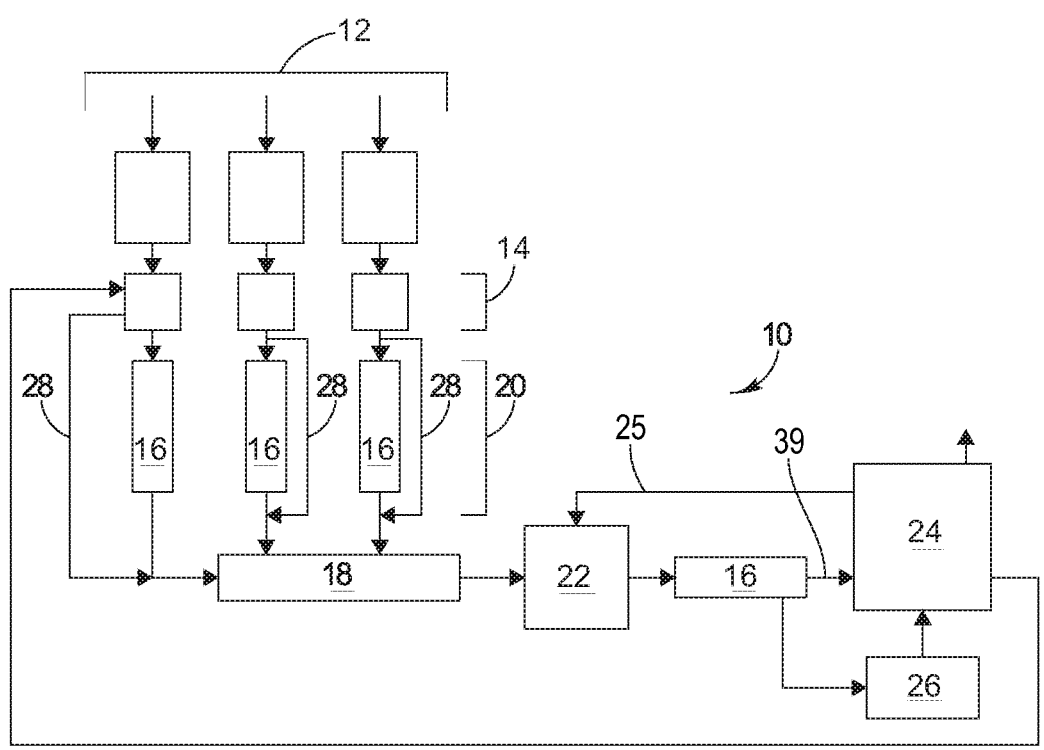
FIG. 1 illustrates in a flow chart a preferred embodiment of the system for blending of alcoholic beverages.

A principal diagram of a preferred system 10 for blending of alcohol beverages is depicted in FIG. 1. The blending system 10 is comprised of the several parts that more efficiently provide for the production and treatment of alcoholic beverages and removal of various contaminants therefrom by using filtration. The system 10 consists of inlet tanks 12 for alcohol beverage components, which tanks 12 are filled with the fluids to be blended. Liquid components of alcoholic beverages are fed from the tanks 12 through a separate dosing pump 14 for each tank 12. The use of separate dosing pumps 14 allow for readily mixing in a continuous flow state. Before mixing, the liquid components of alcoholic beverages from the tanks 12 may be processed in a set 20 of multiple cavitation devices 16—one for each dosing pump 14.

Figure 2:
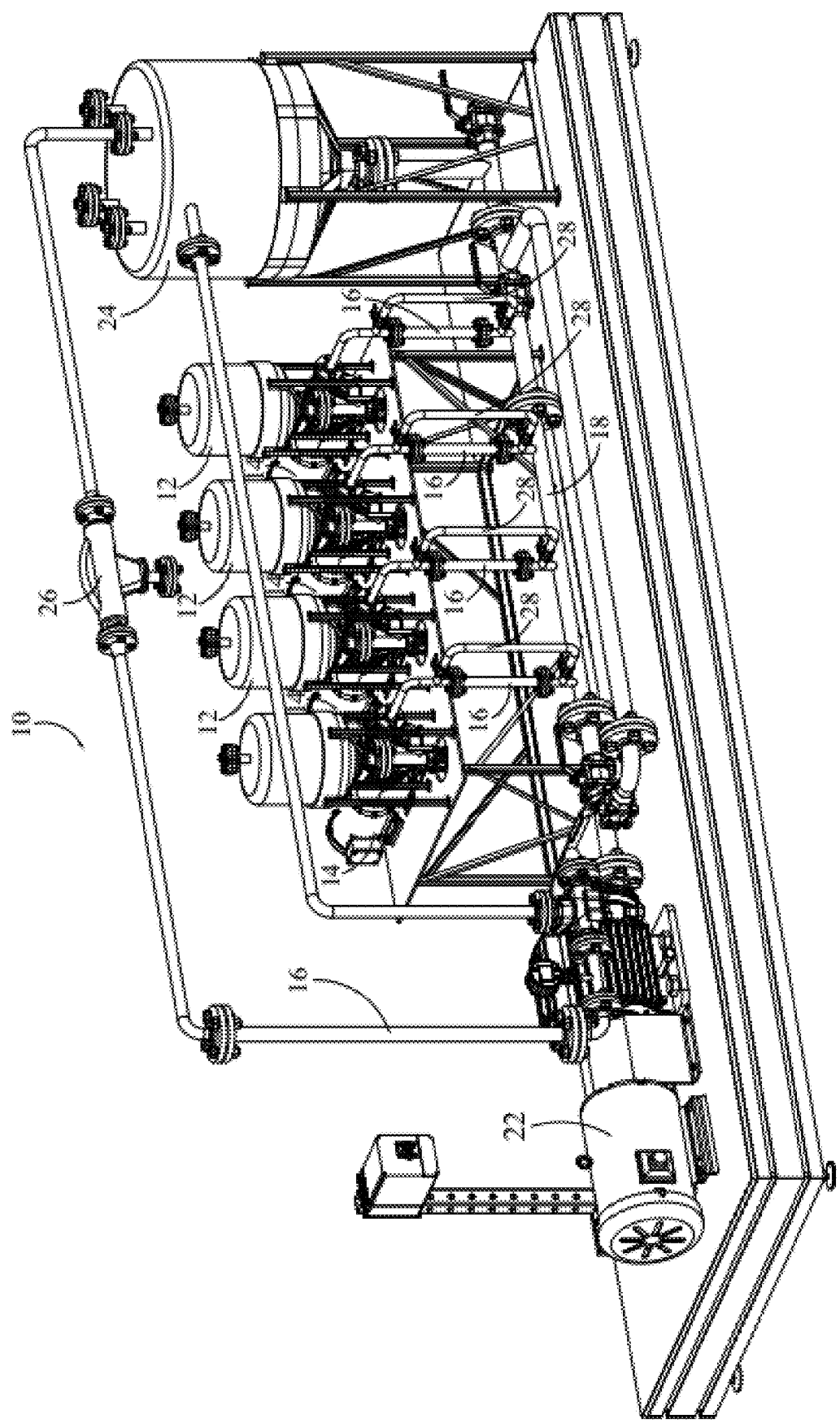
FIG. 2 is an isometric drawing of a preferred embodiment of the system for blending of alcoholic beverages.

The dosing pumps 14 feed the fluids from the tanks 12 to the set of cavitation devices 20 for the cavitation treatment of the fluids (FIG. 1 and FIG. 2). The set of tanks 12, the set of dosing pumps 14 and the set 20 of cavitation devices 16 may comprise one, two, three, or more tanks 12, dosing pumps 14, and devices 16 as needed.

Figure 3:
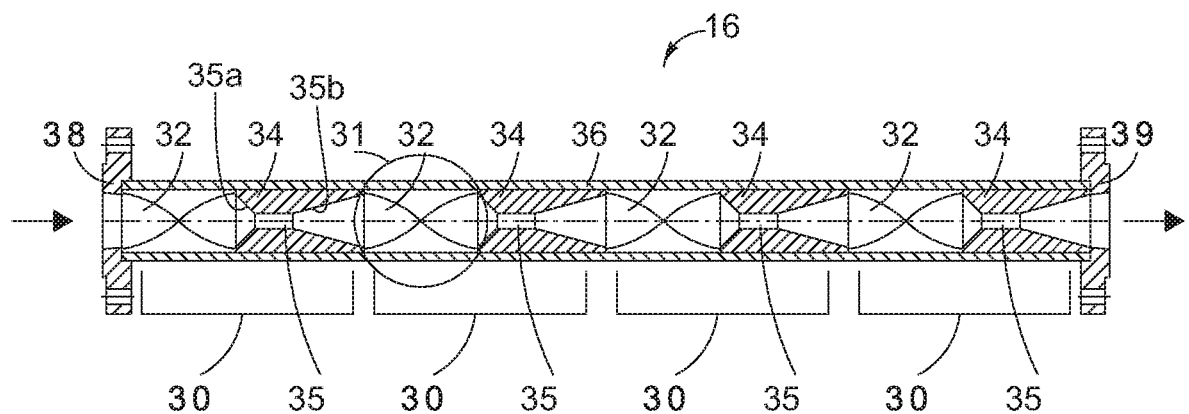
FIG. 3 illustrates a preferred embodiment of the multi-stage cavitation device.

As shown in FIG. 3, the multi-stage cavitation devices 16 preferably comprise several stages or regions 30 to generate cavitation in the fluid stream. A stage or region 30 for generating cavitation preferably consists of at least two elements for swirling and cavitating the fluid flow. The first such element is preferably a twisted plate 32 to form a single spiral element, i.e., a single planar element twisted along a longitudinal axis, to tighten and swirl the flow of liquid. The second such element is preferably a work piece in the form of a cylinder 34 with a central channel 35 having a constriction nozzle 35a and expansion diffuser 35b in the channel for inception of cavitation in the liquid. The constriction 35a and expansion 35b of the passage section of the fluid flow of the central channel 35 is preferably designed in the form of a Venturi tube. The cavitation stages 30 are installed in a housing 36. Feeding and discharge of the treated liquid is done through inlet 38 and the outlet 39 installed on the housing 36.

In the multi-stage cavitation device 16 (FIG. 3), macro vortexes are generated in the fluid flow, by both the twisted plate 32 and cylinder 34, which are accompanied by local pressure decreases to the saturated vapor point of the fluid at the given temperature. When this happens, the proper conditions for the growth of cavitation nuclei in the cavitation bubbles are reached. The formed cavitation bubbles pulse and implode in downstream high-pressure zones.

Figure 4:
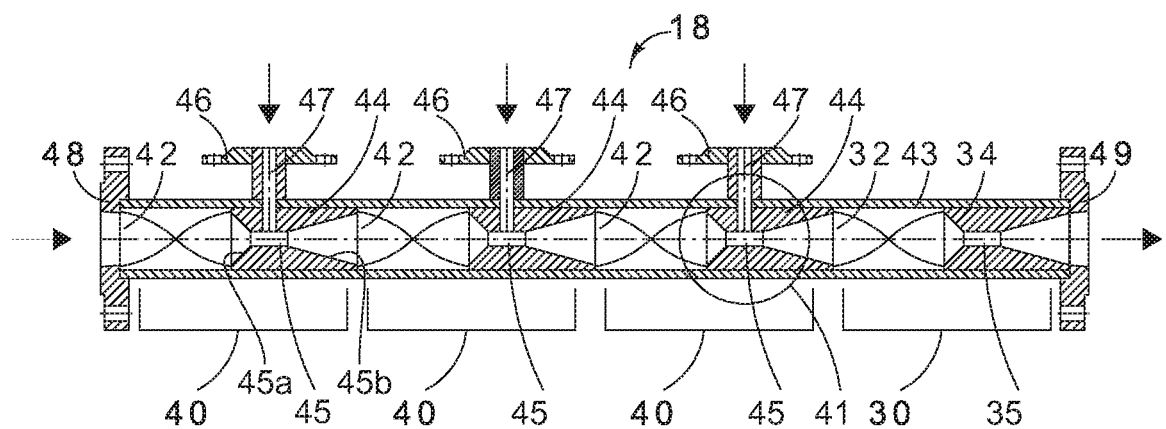
FIG. 4 illustrates a preferred embodiment of the multi-stage blending hydrodynamic device.

Blending of an alcoholic beverage is carried out in a multi-stage blending hydrodynamic device 18 that contains mixing zones for components 40 (FIG. 4). A region 40 for components blending may consist of elements such as a twisted plate 42 to form a single spiral element, i.e., a single planar element twisted along a longitudinal axis, to tighten the flow of liquid and a work piece in the form of a cylinder 44 with a central channel 45 having a constriction nozzle 45a and expansion diffuser 45b in the passage section of the fluid flow for inception of cavitation. The constriction 45a and expansion 45b of the passage section of the fluid flow of the central channel 45 is preferably designed in the form of Venturi tube. The blending stages 40 are installed in a housing 43. Feeding and discharge of the treated liquid is done through inlet 48 and the outlet 49 installed on the housing 43.

Figure 5:
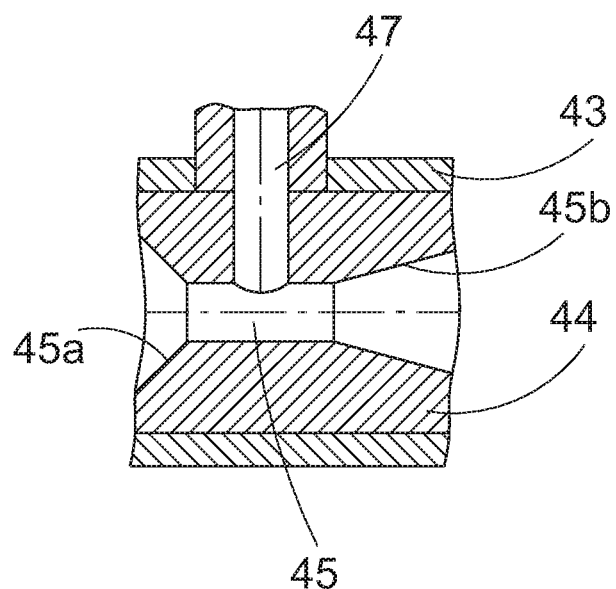
FIG. 5 is a close-up view of an injection zone on the multi-stage blending hydrodynamic device in circle 41 of FIG. 4.
Figure 6:
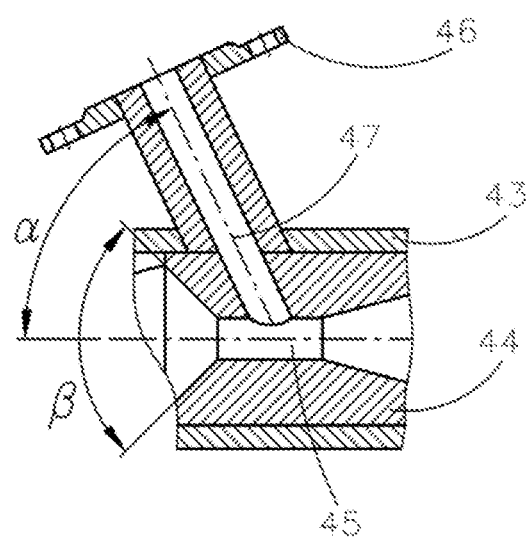
FIG. 6 is a close-up view of an alternate embodiment of the injection zone on the multi-stage blending hydrodynamic device.

The central channel 45 has a channel 47 for introducing the component into the main stream of the alcoholic beverage (FIG. 4). The channel 47 can be located both perpendicular to the channel 45 and at an angle to it (FIG. 5, FIG. 6). To supply the component to the channel 47, a branch pipe 46 is installed on the housing body 43, through which the component is fed into the device 18. The twisted plate 42 for swirling the flow ensures fluid flow along a spiral path. Consequently, in the central part of the flow in the channel 45, the pressure is significantly reduced compared to the flow along a straight path. This helps to reduce the hydraulic resistance when injecting the component into the main flow of the resulting alcoholic beverage.

The location of the channel 47 at an angle $\alpha$ to the central channel 45 will also help to reduce the hydraulic resistance when the component is injected into the main flow (FIG. 6). The angle of intersection a of the central axes of the central channel 45 and the channel 47 is recommended to be selected from the interval $\beta/2 \leq \alpha \leq 90°$, where $\beta$ is the angle of the conical surface forming a constriction in the cylinder 44 immediately before the central channel 45. The upper limit of the angle $\alpha$ is due to the fact that at a value greater than 90 degrees, the injected flow from the channel 47 will face the main flow in the channel 45, which greatly reduces the injection effect and increases the hydraulic resistance device. The lower limit of the angle $\alpha$ is due to the value of the angle of narrowing of the flow $\beta$, which forms the current lines in the initial portion of the liquid flow in the central channel 45. In addition, at an angle $\alpha$ of less than half the angle $\beta$, the conical surface of the confuser and the cylindrical surface of the channel 45 can intersect.

At a high flow rate in channel 45, the flow of the injected component from channel 47 is sucked into it. If the flow velocity in channel 45 is sufficiently high, the component flow from the channel 47 to the channel 45 can be achieved without pumping. In this case, it is possible to exclude the supply of the component to the device 18 by the dosing pumps 14. Calculation of the parameters of the main and injected flow is carried out according to the known method of calculating injectors (Pullen, William Wade Fitzherbert. Injectors: the Theory, Construction and Working (Second ed.) London: The Technical Publishing Company Limited, 1900). The number of injection zones 40 is preferably one less than the number of mixing flows being supplied by the tanks 12. The main component of the produced alcoholic beverage is supplied to the inlet 48.

Figure 7:
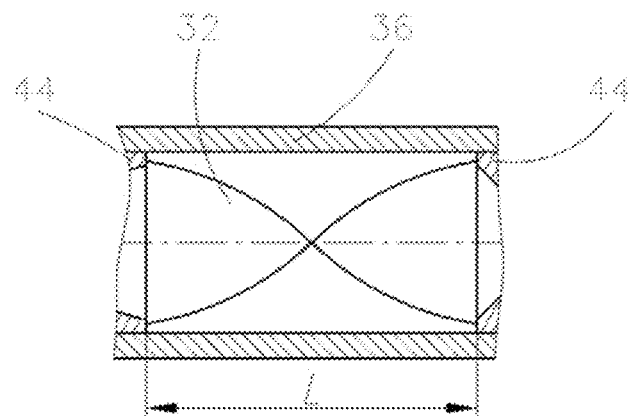
FIG. 7 is a close-up view of a swirling zone on the multi-stage cavitation device in circle 31 of FIG. 3.
Figure 8:
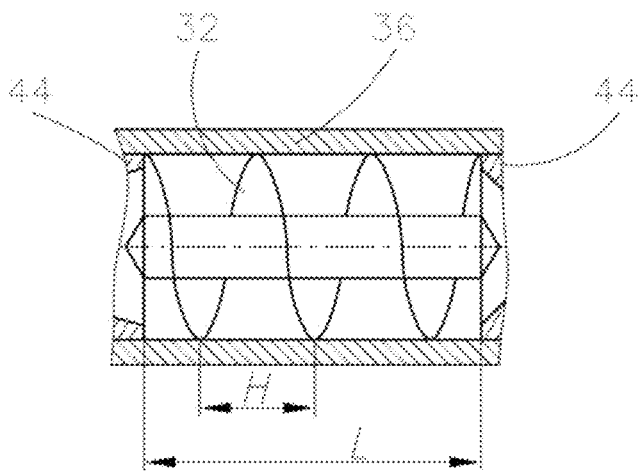
FIG. 8 is a close-up view of an alternate embodiment of the swirling zone on the multi-stage cavitation device.
Figure 9:
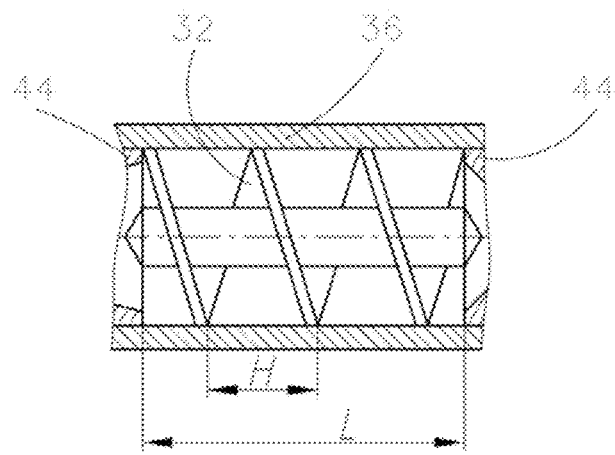
FIG. 9 is a close-up view of another alternate embodiment of the swirling zone on the multi-stage blending hydrodynamic device.

The elements 32, 42 for creating swirling flows can be made either in the preferred form of a twisted plate (FIG. 7), or in the form of an auger (FIG. 8) or a screw (FIG. 9) in a single-pass or multi-pass version. The recommended length of the part for swirling the flow L can be chosen from the relation $0.5H \leq L \leq 3H$, where H is a screw step. If the length of the part for swirling the flow is $L=0.5H$, the angle of rotation of the helical surface of the element is preferably 180 degrees. This is sufficient to ensure a spiraling path of flow of fluid in the channel 45. If the length of the part for swirling the flow is $L=3H$, the angle of rotation of the helical surface of the element is preferably 1080 degrees. The swirling of the flow at an angle of more than 1080 degrees is impractical, since it significantly increases the hydraulic resistance of the section for swirling the flow.

At the outlet of the device 18, a cavitation module 30 may be installed to generate vortices and cavitation for better mixing of the flow components. The cavitation module 30, as described above, may consist of elements such as a twisted plate 32 and a cylinder 34 with a central channel 35 having a constriction 35a and expansion 35b. The outlet 49 of the blending device 18 is connected to the inlet port of the main or system pump 22.

The main hydrodynamic and cavitation treatment of the alcoholic beverage is carried out in a multi-stage cavitation device 16, which is connected to the outlet on the main or system pump 22 (FIG. 1, FIG. 2). The outlet pipe or return fluid line 39 of the multistage cavitation device 16 is connected to the finish or main fluid tank 24 for the processed alcohol beverage. Between the finish tank 24 and the cavitation device 16, a filter module 26 may be installed to remove impurities and contaminants from the alcoholic beverage. The filter module 26 may have a cartridge containing loose filter or adsorbent material, fibrous material, rigid or flexible porous tubes or membranes. For multiple treatments of an alcoholic beverage in the cavitation device 16, a processing outlet line 25 from the finish tank 24 can be recycled to the inlet of the main pump 22.

Figure 10:
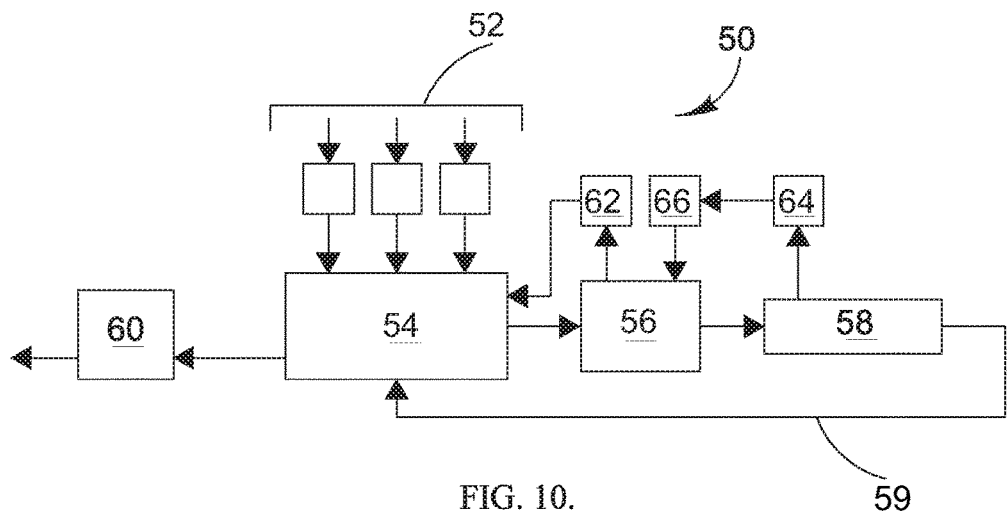
FIG. 10 illustrates in a flow chart another preferred embodiment of the system for blending of alcoholic beverages.
Figure 11:
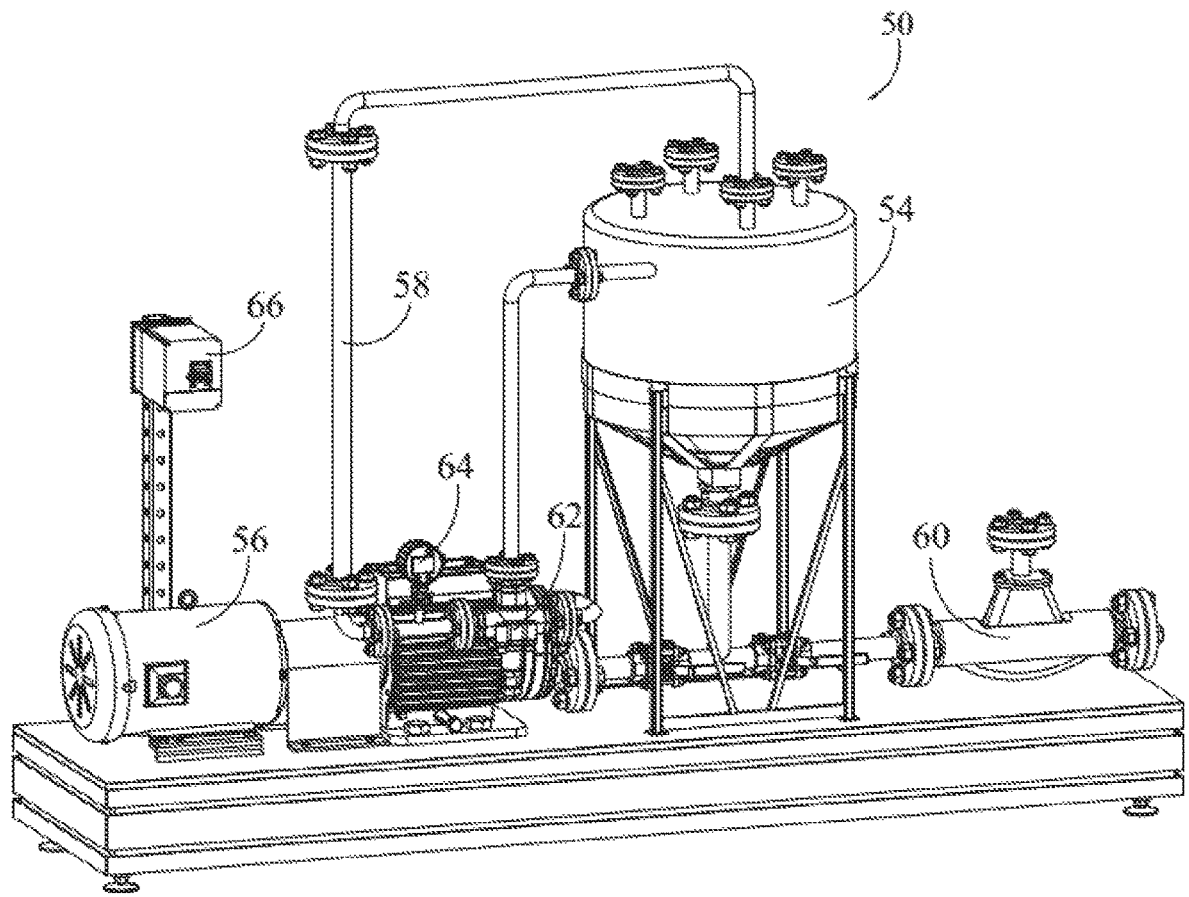
FIG. 11 is an isometric drawing another preferred embodiment of the system for blending of alcoholic beverages.

The scheme of an alternate system for blending and improvement of the quality of alcohol beverages is shown in FIG. 10 and FIG. 11. This alternate embodiment of the system 50 for blending and improvement of the quality of alcohol beverages comprises the liquid measure tanks 52, which measuring or inlet tanks 52 are not shown in FIG. 11 for simplicity. The measuring tanks 52 are fluidly connected to main or storage tank 54. A system pump 56 is connected to the tank 54 for transfer of the liquid to be treated to multi-stage cavitation devices 58, similar to the cavitation device 16 described above. From the device 58, the alcoholic beverage passes through return line 59 where it re-enters tank 54. A filter cartridge 60 is connected to the outlet from the tank 54 to remove chemical impurities, as well as solid and colloidal particles from the liquid. The filter cartridge 60 may have a cartridge containing loose filter or adsorbent material, fibrous material, rigid or flexible porous tubes or membranes.

The system 10 and the alternate version of the system 50 preferably has a safety valve 62 to control fluid flow in multiple processing modes, whether to dispense blended alcoholic beverage, or to rinse and drain washing water from the system. Although not shown in FIG. 1, the first embodiment of the system 10 may also include a safety valve 62 on the main pump 22 as described for the system 50. To control the fluid pressure at the outlet of the pump 56, a manometer 64 is provided. The operation of the devices 10 and 50 is controlled through an electronic control system 66 that is operationally connected to pump 56.

Looking at FIG. 1, the inventive blending system 10 preferably functions as follows. The components of an alcoholic beverage, for example, water, ethyl alcohol, solutions of aromatic and flavor additives are poured into containers 12 in the proportions of the recipe. In accordance with the technology, the components can be separately treated in a multi-stage cavitation device 16. To this end, a separate component or several components are pumped through the device 16 by metering pumps 14. In a multi-stage cavitation device 16, the liquid component undergoes intensive hydrodynamic and cavitation treatment. If the technology for preparing an alcoholic beverage does not involve the hydrodynamic and cavitation treatment of one or more components, same can be fed to the blending device 18 along the bypass lines 28.

When the treated fluid flows into the multi-stage cavitation device 16, it passes through the inlet 38 and successively passes through each cavitation generating stage 30 and then is discharged from the multi-stage cavitation device 16 through the outlet 39. At each stage 30, the liquid first flows around the helical plate 32 and then passes through the cylinder 34, having in sequence the constriction nozzle 35a, the central channel 35 and the expansion diffuser 35b. As the liquid flows relative to the surface of the helical plate 36, the liquid swirls. The swirling flow passes through the central channel 35 of the cylindrical body 34, entering the constriction nozzle 35a and exiting the expansion diffuser 35b, having the overall shape of a Venturi tube, in which cavitation is generated. The swirling flow passes through the central channel 37 at a higher velocity than a comparable flow with streamlines parallel to the central axis 37. The high flow velocity in the zone of the channel 35 with a minimum flow area or throat of the Venturi tube causes reduction in the flow pressure to the saturated vapor pressure and the formation of cavitation bubbles that pulsate and collapse when they enter the zone of increased pressure in the diffuser or at the outlet of the Venturi tube.

The collapse of cavitation bubbles produces enough energy for the dissociation of water, alcohol and other molecules followed by the generation of protons, hydroxyl ions, hydroxyl radicals, peroxide and hydrogen molecules. Gas molecules present in these bubbles are excited and affected by multiple energy and charge exchange processes. Oxygen and hydrogen molecules participate in a number of reactions, including the formation of hydroperoxyl radicals.

For blending an alcoholic beverage, its components are mixed in the device 18, the diagram of which is shown in FIG. 4. The flow of the bulk component is supplied to the inlet 48 of the device 18. As it passes through the swirling zone, the main flow passes into a spiraling motion as it flows around the part for swirling the flow, for example, in the form of a twisted plate 42 and then enters the constriction nozzle 45a, central channel 45, and expansion diffuser 45b of the cylinder 44. In the central channel 45, the flow is accelerated and the pressure in the flow decreases. Due to an injection effect, another component of the mixed alcoholic beverage is drawn by vacuum into the flow through the channel 47. The alcoholic beverage component can also be supplied from the channel 47 under pressure by the metering pump to the channel 45 through the channel 47. Due to the vortex flow of the main flow, and also due to the cavitation effect, the components of the alcoholic beverage are mixed.

The mixture flow of the two components of the alcoholic beverage passes to the next mixing zone 40, where another component is mixed with this mixture. The number of mixing zones 40 should be smaller by one than the number of fluid components. The required number of components in a given volume is added to the flow of the mixture of alcoholic beverage.

In order to prepare a homogeneous mixture of components, a cavitation module 30 for generating vortices and cavitation may be installed just before the outlet 49 of the device 18 for better mixing of the flow components. Components of the flow of alcoholic beverages are intensively mixed and processed in it due to vortex formation and cavitation.

From the mixing device 18, the flow of the alcoholic beverage enters the main pump 22, and then under pressure it is fed to a multi-stage cavitation device 16. When the treated fluid flows into the multi-stage cavitation device 16, it passes through the inlet 38 and successively passes through each cavitation generating stage 30 and then be discharged from the multi-stage cavitation device 16 through the outlet 39. At each stage 30, the liquid first flows around the helical plate 32 and then passes through the cylinder 34, having in sequence the constriction nozzle 35a, central channel 35, and expansion diffuser 35b. As the liquid flows relative to the surface of the helical plate 32, the liquid swirls. The swirling flow passes through the central channel 35 of the cylindrical body 34, entering the constriction nozzle 35a and exiting the expansion diffuser 35b, having the overall shape of a Venturi tube, in which cavitation is generated. The swirling flow passes through the central channel 35 at a higher velocity than a comparable flow with streamlines parallel to the central axis 37. The high flow velocity in the zone of the channel 35 with a minimum flow area or throat of the Venturi tube causes reduction in the flow pressure to the saturated vapor pressure and the formation of cavitation bubbles that pulsate and collapse when they enter the zone of increased pressure in the diffuser or at the outlet of the Venturi tube.

The collapse of cavitation bubbles produces enough energy for the dissociation of water, alcohol and other molecules followed by the generation of protons, hydroxyl ions, hydroxyl radicals, peroxide and hydrogen molecules. Gas molecules present in these bubbles are excited and affected by multiple energy and charge exchange processes. Oxygen and hydrogen molecules participate in a number of reactions, including the formation of hydroperoxyl radicals.

Alcoholic beverages based on an aqueous solution of alcohol (vodka, brandy, whiskey, rum, gin and others), as well as food ethanol may contain impurities such as Acetaldehyde and/or Acetal, Benzene, Methanol, Fusel Oils, as Isobutyl, Isoamyl and active Amyl, Non Volatile Matter, Heavy Metals and others. The presence of these impurities in alcohol-containing beverages reduces their flavor and aroma qualities. Cavitation treatment of alcohol beverages and ethanol causes destruction of impurities, and decreases the concentration of Acetaldehyde, Acetal, Benzene, Methanol, Fusel Oils, precipitation of salts of heavy metals, thus helping to improve the organoleptic indicators of alcohol beverages.

After the hydrodynamic cavitation treatment in the device 16, the flow of the alcoholic beverage can be directed to the finished product tank 24. The filtration module 26 provides filtration on the fluid. The filter module 26 can be installed in the form of a standard cartridge for quick replacement. In the design of the filter module 26, various materials and substances can be used for mechanical or sorption purification of liquids in the form of loose, fibrous materials, flexible or rigid tubes and membranes. The filter module 26 can work in a dead-end mode, where a contaminated fluid passes through a special pore-sized microfilter to separate suspended particles from the process liquid. In the filtration module 26, an alcohol beverage is purified to remove microparticles, solid particles, and colloid particles, whose dimensions are larger than the pores of the microfilter.

From the tank 24, the alcoholic beverage is drained for transfer to the consumer. The alcoholic beverage can undergo additional treatment in the device 16, if necessary or in accordance with the technology. To this end, the beverage from the tank 24 may be supplied to the inlet of the pump 22. In this case, other flows are not supplied to the pump 22. From the pump 22, the beverage is fed for repeated or multiple treatment in the device 16. If necessary, one or more of the components may be re-added to the alcoholic beverage, wherein the beverage is re-supplied from the tank 24 to the inlet of the blending device 18. The necessary component(s) is(are) also supplied to the device 18 from the tank 12 through another metering pump 14. From the mixing device 18, the alcoholic beverage is supplied to the pump 22, and then is recycled in the device 16 and enters the tank 24.

The scheme of the system for producing alcoholic beverages 50 is alternatively shown in FIG. 10. In the system 50, the liquid components of the alcoholic beverage are transferred from inlet tanks 52 into main tank 54. In the tank 54, a stirring device may be installed to premix the components. The initial mixture of components is fed to the system pump 56, from which it enters the multi-stage cavitation device 58, where homogenization, hydrodynamic and cavitation processing of the alcoholic beverage occur. From the device 58, the alcoholic beverage passes through return fluid line 59 where it re-enters the tank 54 again and may be processed multiple times, circulating in a closed loop from the tank 54 to the pump 56 and the device 58.

The pump 56 has a safety valve 62 that operates at a pressure higher than the preset pressure. The valve 62 is connected to the tank 54 into which liquid can flow when the valve 62 is actuated. A pressure sensor is installed at the outlet of the pump 56, upon the signal from which the pump 56 can be stopped if the pressure exceeds a predetermined value.

After repeated treatment of the alcoholic beverage in system 50, it is drained into tank 54, from which through filter 60 it can be discharged through the outlet.

One or more components in the required volume can be re-added to an alcoholic beverage. To do this, the component is poured into the tank 54 while the pump 56 is running. With the circulation mixing in the system 50, the alcoholic beverage is homogenized and treated in the device 58 to the desired condition.

Figure 12:
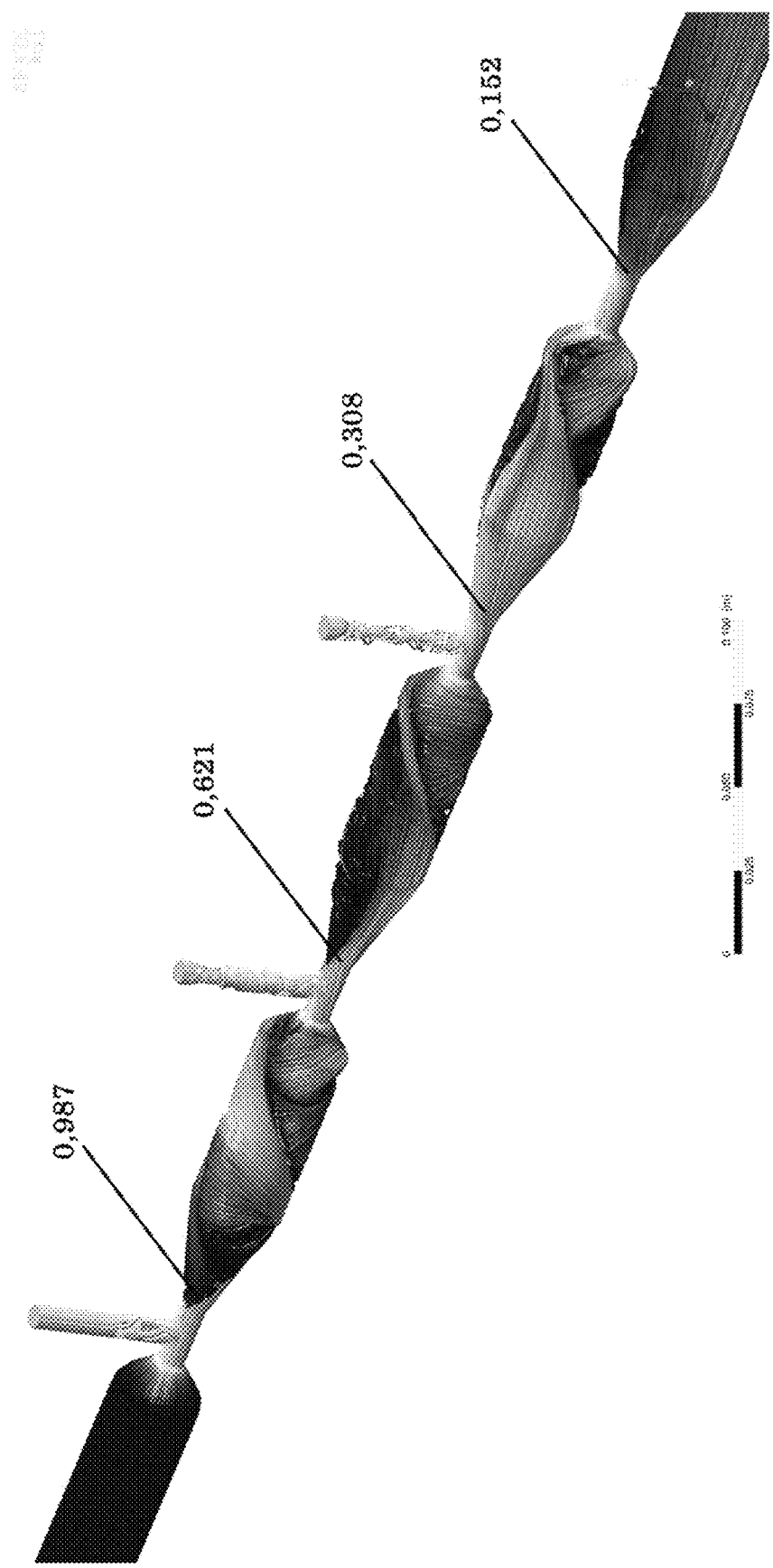
FIG. 12 is a computer modeling of flow lines through a preferred embodiment of the blending device according to the present invention.

FIG. 12 illustrates a computer modelling of flow lines through a preferred embodiment of the blending device 18 described herein. This modelling shows how the fluid flows through each mixing or blending stage 40 as well as, enters through the side channels 47. The dark areas are regions where the fluid flow rate is comparatively lower and generally correspond to the swirling elements 42. The light areas are regions where the fluid flow rate is comparatively higher and generally correspond to the central channels 45 and side inlets 47. Each of these areas of increased fluid flow rate also result in increased agitation and mixing of the fluid components.

The choice of components for an alcoholic beverage can be carried out by the consumer in accordance with the recommended recipe and technology or the consumer can independently choose the components and their volumes.

Example 1

The form of flow lines and mixing several components, calculated with the specialized software ANSYS for the blending device 18 (length 50 cm, diameter 4 cm, 3 mixing zones) which is similar to the apparatus in FIG. 4 is shown on FIG. 12. Flow moves from left to right. The central channel 45 of cylinder 44 and the central channel 35 of cylinder 34 have the Venturi tube profile in a longitudinal section (FIG. 4). The device 18 was operated at a flow rate of 10 gpm and an inlet pressure of 300 psi. The flow lines show that there is an intensive blending of the components. The presence of hydrodynamic cavitation determines the number of cavitation ($C_V$) shown for each zone. Cavitation onsets after the hydrostatic pressure of the liquid has decreased to the saturated vapor pressure of the liquid or its components and is categorized by the cavitation number ($C_V$). Cavitation ideally begins where ($C_V$) equals 1, where a ($C_V$) less than 1 indicates a high degree of cavitation. The example in FIG. 12 it is indicated for the water flow as the main component.

Example 2

Purified water in the volume of 600 ml and ethyl alcohol (96%) in a volume of 400 ml were poured into the tank 54. A sample of an untreated mixture of alcoholic beverage of the "vodka" type was pumped through the device 58 for 10 minutes circulating in a closed loop. The pressure at the outlet of the pump was 300 psi, the flow was 10 GPM. After treatment, an alcoholic drink of the "vodka" type was drained from the tank 54 through a filter 60. Impurities were determined using FFAP column chromatography.

Table 1 shows that the amount of chemical impurities in vodka decreased by an average of 16%. The harsh smell of vodka dissipated, and its taste became softer.

TABLE 1

| Impurity | Concentration, milligram/liter | |
|---|---|---|
| | Before treatment | After treatment |
| Acetaldehyde | 1.0634 | 1.0122 |
| Methyl acetate | 0.912 | 0.840 |
| Ethyl acetate | 0.888 | 0.862 |
| Isopropanol | 1.096 | 1.055 |

Although several embodiments have been described in detail for purposes of illustration, various modifications may be made without departing from the scope and spirit of the invention. Accordingly, the invention is not to be limited, except as by the appended claims.

What is claimed is:

1. A system for producing an alcoholic beverage, comprising:
   a fluid tank;
   a pump fluidly connected to a processing outlet on the fluid tank;
   a hydrodynamic cavitation device fluidly connected to an outlet on the pump;
   wherein the hydrodynamic cavitation device comprises a plurality of cavitation stages;
   wherein each of the plurality of cavitation stages comprises a helical plate immediately followed by a cylinder body, wherein the helical plate consists of a single spiral element forming a spiral flow path and the cylinder body comprises in sequence a constriction nozzle, a central channel, and an expansion diffuser; and
   a fluid line fluidly connecting an outlet of the hydrodynamic cavitation device to the fluid tank.

2. The system of claim 1, wherein the helical plate has a length that satisfies the relationship $0.5H<=L<=3H$, where H is a height of a step and L is the length of the swirling element.

3. The system of claim 2, wherein an angle of rotation of the helical plate is 180 degrees when $L=0.5H$ and 1080 degrees when $L=3H$, having a proportional angle of rotation therebetween.

4. The system of claim 1, further comprising a plurality of inlet fluid tanks fluidly connected to the fluid tank, wherein each inlet fluid tank contains a fluid component of the alcoholic beverage.

5. The system of claim 4, further comprising a hydrodynamic blending device fluidly disposed between the plurality of inlet fluid tanks and the fluid tank, wherein the hydrodynamic blending device comprises a plurality of mixing stages, the number of mixing stages corresponding to one less than the number of inlet fluid tanks.

6. The system of claim 5, wherein each of the plurality of mixing stages comprises a swirling element forming a spiral flow path followed by a cylinder element forming a constricted-expanded flow path and having a side inlet channel in the cylinder element.

7. The system of claim 6, wherein one of the plurality of inlet fluid tanks is fluidly connected to a main inlet on the blending device and the remaining plurality of inlet fluid tanks are each fluidly connected to one of the plurality of mixing stages through the corresponding side inlet channel.

8. The system of claim 6, wherein the side inlet channel is oriented at an angle of intersection ($\alpha$) relative to the cylinder element according to the relationship $\beta/2<=\alpha<=90$ degrees, where $\beta$ is an angle of a conical surface in the cylinder element immediately before the constricted-expanded flow path.

9. The system of claim 6, wherein the blending device further comprises a cavitation stage disposed after the plurality of mixing stages.

10. The system of claim 7, further comprising a dosing pump and an individual cavitation device serially and fluidly disposed between each of the plurality of inlet fluid tanks and the blending device.

11. The system of claim 10, wherein the individual cavitation device comprises a plurality of cavitation stages having a swirling element forming a spiral flow path followed by a cavitation element forming a constricted-expanded flow path.

12. The system of claim 11, further comprising a bypass line selectively connecting the dosing pump directly to the blending device.

13. The system of claim 1, further comprising a filter element fluidly disposed between the hydrodynamic cavitation device and the fluid tank.

14. The system of claim 1, further comprising a filter element fluidly connected to a final outlet on the fluid tank.

15. The system of claim 1, further comprising a safety valve fluidly connecting the system pump directly to the fluid tank so as to selectively bypass the cavitation device.

* * * * *